July 24, 1956
R. J. KUTZLER
2,756,011
CONTROL APPARATUS
Filed May 1, 1943
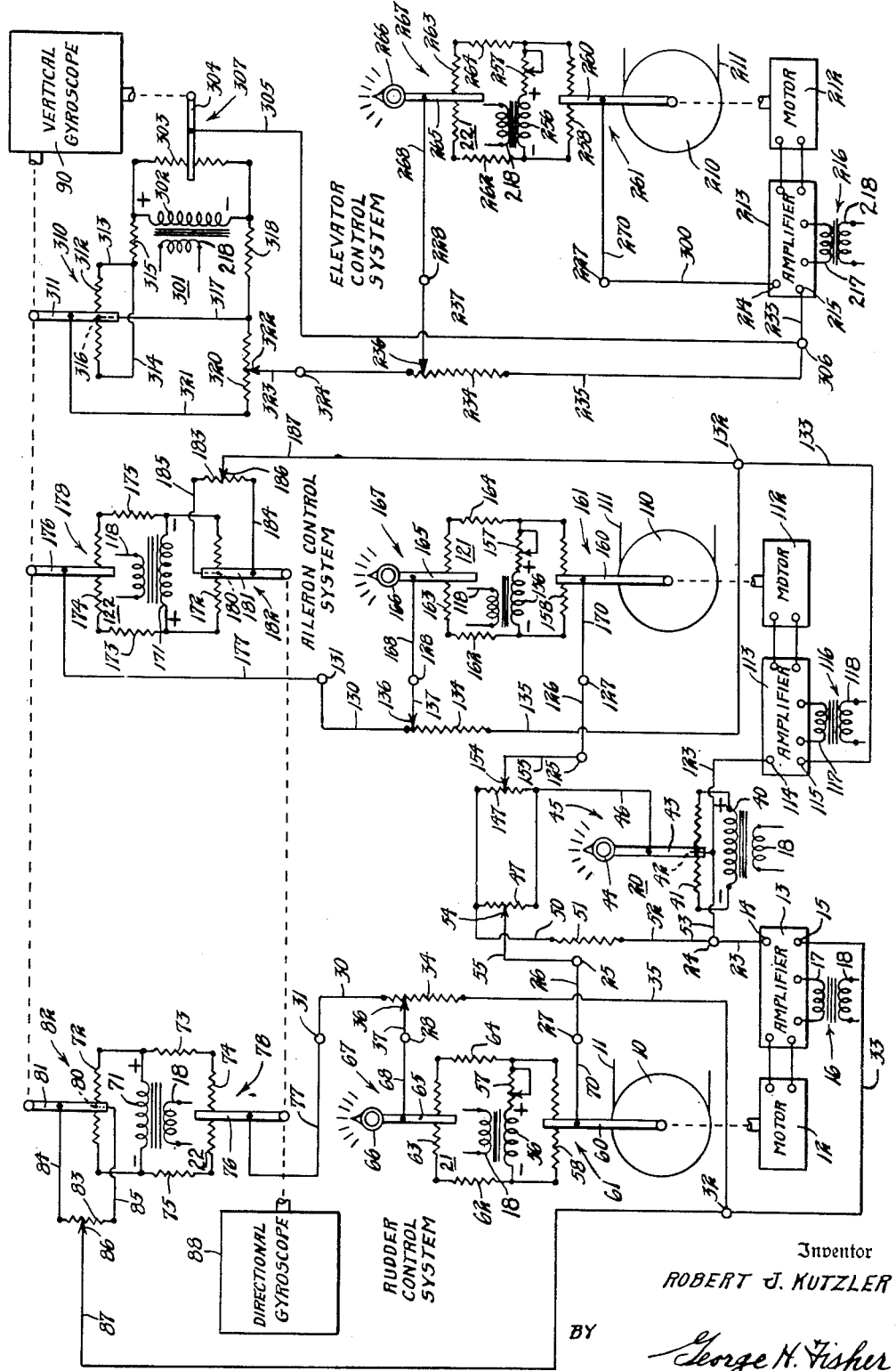
Inventor
ROBERT J. KUTZLER
BY
George H. Fisher
Attorney United States Patent Office 2,756,011
Patented July 24, 1956

2,756,011

CONTROL APPARATUS

Robert J. Kutzler, Minneapolis, Minn., assignor to Minneapolis-Honeywell Regulator Company, Minneapolis, Minn., a corporation of Delaware Application May 1, 1943, Serial No. 485,319

32 Claims. (Cl. 244—77)

The present invention relates to electrical control apparatus in general, and particularly to apparatus for automatically operating the flight control surfaces of an aircraft.

An object of the present invention is to provide an improved flight control system for aircraft of the type shown and described in the co-pending application of Willis H. Gille, Serial No. 447,989, filed June 22, 1942.

Another object of the present invention is to provide an improved electrical control system in which a load device is positioned in accordance with the resultant of a plurality of controlling conditions. A further object is to provide, in a system of the type described, improved means for manually shifting the position of the load device with respect to the value of the controlling conditions. A further object is to provide, in such a system, improved means for varying the distance moved by the load device in response to a given change in the magnitude of any of the controlling conditions.

Another object of the present invention is to provide an improved control system including a first control device automatically responsive to a variable condition, a second manually variable control device, a load device to be positioned in accordance with the resultant of the control effects produced by the two control devices, and means for relatively varying said control effects.

Another object of the present invention is to provide an improved electrical control system for positioning a load device in accordance with the resultant of a first control effect which varies in accordance with the magnitude and direction of the deviation of a first controlling condition from a predetermined value and a second control effect which varies in accordance with the magnitude, regardless of direction, of the deviation of a second controlling condition from a predetermined value.

A further object of the present invention is to provide an improved electrical network for use in a system for controlling the elevator surface of an aircraft.

Other objects and advantages of the present invention will become apparent from a consideration of the appended specification, claims, and drawing, in which The single figure is an electrical wiring diagram of an automatic flight control system for an aircraft, embodying my invention, including somewhat diagrammatically, certain mechanical features of my invention.

Referring to the drawing, there is shown a rudder control system including a pulley 10 over which passes a cable 11 which may be attached to the rudder (not shown). The pulley 10 is driven by a motor 12. The supply of electrical energy to the motor 12 is controlled by an amplifier 13 having a pair of input terminals 14 and 15. Electrical energy is supplied to amplifier 13 from the secondary 17 of a transformer 16 comprising in addition to the secondary winding 17 a primary winding 18 connected to a suitable source of power (not shown) and a plurality of secondary windings 40, 56, and 71 which are shown in connection with the elements to which they are connected.

Electrical signal potentials are impressed on the amplifier input terminals 14 and 15 by means of a series circuit including a manual control network 20, an adjustment network 21, and a condition responsive control network 22. This series circuit may be traced from amplifier input terminal 14 through a conductor 23, a terminal 24 of manual control network 20, the network 20, a terminal 25 of network 20, a conductor 26, a terminal 27 of adjustment network 21, the network 21, a terminal 28 of network 21, a conductor 37, a contact 36, a portion of a resistance 34, a conductor 30, a terminal 31 of condition responsive network 22, the network 22, a terminal 32 of network 22, and a conductor 33 to amplifier input terminal 15.

The resistance 34 is connected between the terminals 31 and 32 of network 22 by means of conductors 30 and 35, respectively. The contact 36 is slidable along the resistance 34 for a purpose to be described later.

The manual control network 20 is of the type described and claimed in the co-pending joint application of Robert J. Kutzler and Theodore J. Wilson, Serial No. 496,626, filed Dec. 21, 1942, now Patent No. 2,515,349. The manual control network 20 is supplied with electrical energy from the transformer secondary winding 40, which is shown as an additional winding of transformer 16. A resistance 41 having a center tap 42 is connected across the terminals of winding 40. A contact 43 is slidable along the resistance 41 by manipulation of a knob 44. The knob 44, slider 43 and resistance 41 together comprise a control point adjuster 45. The slider 43 is connected in a loop circuit which may be traced through a conductor 46, a pair of parallel resistances 47 and 147, a conductor 50, a fixed resistance 51, a conductor 52, a terminal 24 of network 20, and a conductor 53 to center tap 42 on resistance 41.

It may therefore be seen, that in the network 20, the difference of potential between slider 43 and center tap 42 is impressed on the loop circuit just traced, which includes resistances 47 and 51. A slider 54 is associated with resistance 47, and is connected through a conductor 55 to terminal 25 of network 20. It will therefore be seen that a variable portion of the potential difference between slider 43 and tap 42, depending upon the position of slider 54 adjacent resistance 47, appears between the network terminals 24 and 25, and is thereby impressed on the series circuit connected between the amplifier input terminals 14 and 15.

The adjustment network 21 includes the transformer secondary winding 56 and a variable resistance 57 connected in a series branch therewith. A slidewire resistance 58 is connected across the terminals of that series branch. A sliding contact 60 cooperates with resistance 58, and is fixed on the shaft of the pulley 10. The resistance 58 and the sliding contact 60 together form a follow-up potentiometer 61. Connected in parallel with slidewire resistance 58 is another branch circuit which includes a fixed resistance 62, a slidewire resistance 63, and a fixed resistance 64, all connected in series. A sliding contact 65 cooperates with resistance 63 and is movable therealong by means of a knob 66. The knob 66, slider 65, and resistance 63 together form a centering adjuster 67. Slider 65 is connected through a conductor 68 to output terminal 28 of network 21. Slider 60 is connected through a conductor 70 to output terminal 27 of network 21. It may therefore be seen that the adjustment network 21 introduces into the series circuit connecting amplifier input terminals 14 and 15 a variable potential whose magnitude and phase depends upon the relative positions of sliders 65 and 60 along their respective slidewire resistances.

The condition responsive network 22 includes the transformer secondary winding 71, across the terminals of which is connected a slidewire resistance 72. Connected in parallel with resistance 72 is another branch circuit including a fixed resistance 73, a slidewire resistance 74, and a fixed resistance 75 in series. A sliding contact 76 cooperates with resistance 74, and is connected through a conductor 77 to terminal 31 of network 22. The resistance 74 and slider 76 together form a rudder control potentiometer 78.

The resistance 72 is provided with a center tap 80. A slider 81 cooperates with resistance 72. The slider 81 and resistance 72 together form a rudder compensating potentiometer 82. A slidewire resistance 83 is connected between slider 81 and tap 80 on resistance 72 by means of conductors 84 and 85, respectively. A contact 86 is adjustable along resistance 83 and is connected through a conductor 87 to output terminal 32 of network 22.

Slider 76 of control potentiometer 78 is moved along its associated resistance 74 by a directional gyroscope 88. As long as the aircraft maintains a predetermined course, the gyroscope 88 holds the slider 76 at the center of its associated resistance. Upon deviation of the aircraft from that course, the gyroscope 88 moves the slider 76 to the left or right, depending upon the direction and magnitude of such deviation.

The slider 81 of the rudder compensating potentiometer 82, is operated by a vertical gyroscope 90, in accordance with the tilting of the aircraft about an axis passing through it longitudinally from nose to tail.

Since the primary function of the rudder is to turn the aircraft, the directional gyroscope 88 is used to operate the main controller 78 of the rudder control system. Since the rudder also functions to a limited extent to control the banking of the aircraft, the vertical gyroscope 90 controls the compensating controller 82.

The control potential produced between terminals 31 and 32 of the network 22 is the sum of two potentials, one of which is a fixed function of the position of slider 76 with respect to resistance 74, and the other of which is a variable function of the position of slider 81 with respect to resistance 72. This latter function may be varied by moving the slider 86 with respect to resistance 83, thereby varying the proportion of the potential drop between slider 81 and center tap 80 which is impressed between the terminals 31 and 32 of network 22.

The details of the aileron control system shown in the drawing are, except for certain features specifically mentioned hereinafter, the same as the corresponding details of the rudder control system. Therefore, each element of the aileron control system has been given a reference numeral in the series between 100 and 199, which corresponds to the reference numeral in the series between 1 and 99 of its equivalent element in the rudder control system. Only a brief additional description of the elements in the aileron control system will be given.

It should be noted that the manual control network 20 is common to both the rudder control system and the aileron control system. The primary function of the ailerons is to control the tilting of the aircraft about its longitudinal axis, and therefore the primary controller 178 is operated by the vertical gyroscope 90 in accordance with the tilting of the aircraft about that axis. Since the ailerons also operate to cause a turning of the aircraft, the compensating potentiometer 182 is operated by the directional gyroscope 88 in accordance with the deviation of the aircraft from its course.

In the elevator control system, those elements which correspond to equivalent elements in the rudder and aileron control systems have been given reference characters in the series between 200 and 299, which correspond to the reference characters of their equivalent elements in the rudder and aileron control systems. Elements of the elevator control system which have no counterparts in the rudder and aileron control systems have been given reference characters in the 300 series.

Referring to the elevator control system, it will be seen that there is no manual control network, and that output terminal 227 of adjustment network 221 is directly connected to input terminal 214 of amplifier 213 by means of a conductor 300.

A condition responsive control network 301 is used in the elevator control system, which network is somewhat different from the corresponding networks of the rudder and aileron control systems. The network 301 includes a transformer secondary winding 302 which is shown as a secondary winding of transformer 216, across whose terminals is connected a slidewire resistance 303. A sliding contact 304 cooperates with the resistance 303, and is moved along the resistance 303 by the vertical gyroscope 90 in accordance with the tilting of the aircraft about an axis passing laterally therethrough from side to side. The slider 304 is connected through a conductor 305 to an output terminal 306 of the network 301. The resistance 303 and slider 304 together form an elevator control potentiometer 307. There is also included in the network 301 an elevator compensating potentiometer 310, which comprises a sliding contact 311 cooperating with a slidewire resistance 312. The terminals of resistance 312 are connected through conductors 313 and 314, and a fixed resistance 315 to the upper terminal of secondary winding 302. The resistance 312 is provided with a center tap 316, which is connected through a conductor 317 and a fixed resistance 318 to the lower terminal of winding 302. Another slidewire resistance 320 is connected between slider 311 and center tap 316 by means of conductors 321 and 317. A contact 322 is slidable along resistance 320, and is connected through a conductor 323 to output terminal 324 of network 301.

The various transformer windings should be energized from the same source of alternating electrical energy, in order that the phase relationship of the various voltages supplied by these transformers may be in the proper relation. As shown, the various secondary windings are all associated with transformers 16, 116, and 216, the primaries of which are all connected to the same source of power. If desired, any secondary may be associated with a separate transformer, so long as its primary is connected to the common source of power in the correct phase relationship.

Each of the amplifiers operates in response to the phase of the electrical signal potential applied to its input terminals to cause operation of the motor controlled by the amplifier in one direction or the other. Any suitable amplifier having this characteristic may be used. A typical amplifier which can be used for this purpose is that shown in the patent to Beers No. 2,020,275.

*Operation*

When the parts are in the positions shown in the drawings, no signal is introduced into the input circuit of any of the amplifiers. Referring to the rudder control system, it will be seen that in the manual control network 20 no potential is impressed across the resistances 47 and 51, and hence the output terminals 24 and 25 of the network 20 are at the same potential. In the adjustment network 21, the sliders 65 and 60 are both at the center of their respective slidewires, and are hence at the same potential. Therefore, no signal potential is produced between terminals 27 and 28 of network 21. Likewise, in the control network 22, the sliders 76 and 81 are at the centers of their respective slidewires, and hence no signal potential is produced between the terminals 31 and 32 of network 22. Similar conditions exist in the aileron and elevator control systems, and hence the motors 12, 112 and 212 are all stationary.

For the sake of convenience in describing the operation of this system, it is described as though the operation takes place during a half-cycle of the alternating current supply when the polarities of the terminal potentials of the various transformer secondary windings are those indicated by the respective legends in the drawing.

Starting with the conditions illustrated in the drawings, let it be assumed that the direction of flight of the aircraft changes due to some external condition, and that in response to this change in course the directional gyroscope 88 moves the slider 76 to the right along resistance 74. As a result of this movement, terminal 31 of network 22 is made positive with respect to terminal 32, and this positive potential is transmitted through networks 21 and 20 to terminal 14 of amplifier 13, thereby making terminal 14 positive with respect to input terminal 15.

The motor 12 and amplifier 13 may be so arranged that when a potential of this polarity is impressed on input terminals 14 and 15, the amplifier responds to cause operation of the motor in a direction to move slider 60 to the left along resistance 58. Slider 60 is thereby made more negative than slider 65, and hence output terminal 27 of network 21 is more negative than output terminal 28. The output potentials of networks 21 and 22 are now connected in series and are opposite in polarity. When these two opposing potentials become equal in magnitude, the potential impressed on the input terminals 14 and 15 of the amplifier become zero, and the motor is stopped.

The turning of the rudder by the operation of motor 12 causes the aircraft to turn in a direction to resume its previous course. As it resumes its previous course, the slider 76 is moved back towards its normal position by the directional gyroscope, and the amplifier responds to the change in potential impressed on its input terminals by causing a following movement of the slider 60 back toward its normal position.

In the foregoing description of the operation of the rudder, the effect of the aileron control system has been ommitted for the sake of simplicity. It should be noted, however, that when the slider 76 is moved to the right along resistance 74, the slider 181 is likewise moved to the right along resistance 172. This movement of slider 181 makes output terminal 132 of network 122 negative with respect to output terminal 131. Input terminal 114 is thereby made positive with respect to input terminal 115 of amplifier 113. The amplifier 113 causes a response of motor 112 to drive slider 160 to the left along resistance 158, thereby producing at the output terminals of adjustment network 121 a potential opposite in polarity to the control potential existing at the terminals of control network 122. When these two opposing potentials become equal, the motor 112 stops.

However, the operation of the aileron as the slider 160 is moved to the right causes the aircraft to tilt about its longitudinal axis so that it banks properly during the turn caused by the rudder operation. Because of this tilting of the aircraft, the vertical gyroscope 90 operates the sliders 81 and 176 to the right along their respective slidewires. This motion of these sliders tends to reduce the potential between the output terminals of the control networks 22 and 122, and thereby introduces into the input terminals of amplifiers 13 and 113, a potential which produces a restoring movement of the rudders and ailerons towards their original positions. Therefore, it may be seen that the rudder and ailerons are given an initial large deflection to start the aircraft banking and turning, but after the banked turn has started, the deflection of the rudder and ailerons from their normal position is reduced. This is done because it has been found that a smaller deflection of the rudder and ailerons is sufficient to maintain the aircraft in a properly banked turn after it has once been placed in that position by a larger deflection. If the larger deflection is maintained after the aircraft enters the banked turn, a side slip will result.

The cooperation of the rudder and ailerons during a turn in a system of this type is more completely described in the co-pending Gille application previously referred to, and it is believed that the foregoing description will be sufficient for the purpose of the present application.

Referring to the adjustment network 21, it may be seen that upon an operation of the controller 67, the amplifier 13 will respond to cause a following movement of the slider 60. The controller 67 may therefore be utilized to set the position of slider 60 which the system will maintain for a given position of slider 76. It is termed a centering adjustment, since its primary purpose is to enable the pilot or other operator of the system to insure that the rudder is maintained in a central position when the controllers 78 and 82 are in their respective central positions.

The variable resistance 57 determines the voltage applied to the terminals of resistance 58 and the voltage applied to the terminals of resistance 63. It therefore determines the potential drop per unit length along resistance 58, and therefore establishes the distance through which the slider 60 must move along resistance 58 to produce between output terminals 27 and 28 a given value of potential. It is termed a ratio adjustment, since it establishes the ratio between a given movement of either of the control sliders 76 and 81 and the following movement obtained from the rebalancing slider 60. Since the operation of the resistance 57 simultaneously changes the potential drop per unit length along resistances 58 and 63, and changes them in the same proportions, it may be seen that adjustment of resistance 57 does not affect the centering adjustment produced by operation of controller 67. In the system disclosed in the Gille operation previously referred to, the ratio and centering adjustments are not independently effected as in the present case, but on the other hand, the operation of the ratio adjustment upsets the centering adjustment, particularly when the latter adjustment has been changed considerably from its median position.

The resistance 34 is considerably greater than the resistance of network 22 between terminals 31 and 32. Therefore, when the slider 36 is near the upper end of resistance 34, the network 22 is effectively connected in the series circuit between the amplifier input terminals 14 and 15. When the slider 36 is moved to the lower end of resistance 34, the network 22 is substantially shunted out of the control circuit, so that the networks 20 and 21 completely control the rudder. As the slider 36 is moved along the resistance 34, the relative controlling effects on the rudder of the network 22 on the one hand, and of the network 21 on the other hand, are changed. This adjustment is particularly valuable when the system is being started up, since at that time, the control networks 22 and 122 may be shunted out and the system may be manually controlled. After the system has been started, the control may be gradually shifted from the manual network to the condition responsive network, without producing a sudden unbalance of the system if one of the condition responsive networks is calling for a large operation from the rudder. Thus the system possesses the additional advantage that under certain conditions of which starting up the craft is an example, manual control of the servomotor is still possible. It will be clear therefore that the circuit through control network 22 is not always essential and that it need not affect the circuit from the amplifier through the turn control network 20, conductor 55, the rebalancing and centering network 21, conductor 68, resistor 34, and conductors 35 and 33 to the other terminal of the amplifier. This circuit permits the servomotor to be controlled by either the control point adjuster 45 or the centering adjuster 67, so that it is still possible to fly the plane, although network 22 is inactive. The same remarks apply to the resistance 134 and contact 136 in the aileron control system.

Referring now to the control network 301 in the elevator control system, it may be seen that this network produces at its terminals 306 and 324 a potential which varies both in polarity and magnitude in accordance with the tilting of the aircraft about its lateral axis, as determined by the vertical gyroscope 90 operating the slider 304. In addition, the potential between the output terminals 306 and 324 varies in accordance with the magnitude of the deflection of the aircraft from the normal position with respect to its longitudinal axis, but is not oppositely affected by the deflections about its longitudinal axis in opposite directions. This latter effect is obtained because both terminals of the slidewire resistance 312 are connected to one end of the secondary winding 302, and its center tap 316 is connected to the other end. Hence movement of slider 311 in either direction from its central position causes terminal 324 to become positive with respect to terminal 306. The resistances 315 and 318 are provided in order that the potential of output terminal 324 may be substantially the same as that of output terminal 306 when the sliders 304 and 311 are both in the center of their respective slidewires. The values of resistances 315 and 318 are so selected with reference to the value of resistance 312 that the total resistance value of resistance 315 and the two parallel connected halves of resistance 312 is equal to the resistance value of resistance 318. Thus the potential at the center tap 316 will be the same as the potential at the center of potentiometer 307. The slider 322 serves to adjust the proportion of the output potential of network 301 produced by controller 310 with respect to the proportion produced by the controller 307.

The elevator control system tends to maintain the aircraft in a condition of level flight. So long as the aircraft is flyiing a straight course, and does not tilt about its horizontal axis the slider 311 remains at its center position, and the potential between the terminals 306 and 324 of network 301 is determined only by the position of slider 304. With the slider 304 in its center position, no potential difference exists between terminals 306 and 324. The motor 212 is then not operated, and the aircraft maintains its level flight.

If the nose of the aircraft rises, the vertical gryoscope 90 responds to the tilting of the aircraft about an axis passing laterally through it by causing movement of slider 304 downwardly along resistance 303. This produces a potential between terminals 206 and 324 which makes amplifier input terminal 215 negative with respect to terminal 214. The amplifier and motor may be so connected that a potential of this polarity will cause an operation of motor 212 in a direction to move the slider 260 to the left, thereby producing at the terminals 227 and 228 of network 221 a potential opposite in polarity to that produced by network 301. At the same time, the elevator is deflected in a direction to restore the aircraft to level flight.

It is believed to be readily understandable that a similar operation takes place in the opposite sense when the nose of the aircraft falls.

It has been found that when air aircraft is maneuvered through a turn, its nose tends to drop unless a corrective adjustment is made by the elevator. The tendency to drop is the same regardless of the direction in which the aircraft turns. Therefore, the compensating controller 311 is provided, which is operated by the vertical gyroscope 90, and is effective upon a tilting of the aircraft about its longitudinal axis to produce between the terminals 306 and 324 a potential of the proper polarity to cause the elevator to operate in a direction to raise the nose of the aircraft.

The operation of the elevator control system is believed to be apparent from the foregoing discussion. A more complete discussion of a similar system may be found in the Gille application previously mentioned.

While I have shown and described a preferred embodiment of my invention, other modifications and applications thereof will occur to those skilled in the art, and I therefore wish my invention to be limited only by the scope of the appended claims.

I claim as my invention:

1. Electrical apparatus for positioning a flight controlling surface on an aircraft, comprising in combination, motor means for driving said surface, a pair of bridge circuits, each said bridge circuit comprising a source of electrical energy, a pair of resistances connected in parallel across the terminals of said source, and a pair of contacts one movable along each of said resistances, said pair of contacts constituting the output terminals of said bridge circuit, one contact of one bridge circuit being connected in series with one contact of said other bridge circuit to connect said bridges in series, the remaining contacts constituting the output terminals of said series connected bridge circuits, means responsive to each of a pair of controlling conditions indicative of the need for operation of said surface for moving one of the contacts in one of said bridge circuits, means driven by said motor means for moving one of the contacts in the other of said bridge circuits, manually operable means for moving the other contact in the said other bridge circuit, and means connected to said remaining contacts of said bridge circuits and responsive to the potential across said series connected bridge circuits for controlling said motor means.

2. Electrical control apparatus, comprising in combination, a load device to be positioned in accordance with the resultant of a plurality of controlilng conditions, motor means for driving said load device, a pair of bridge circuits, each said bridge circuit comprising a source of electrical energy, a pair of resistances connected in parallel across the terminals of said source, and a pair of contacts, one movable along each of said resistances, said pair of contacts constituting the output terminals of said bridge circuit, one contact of one bridge circuit being connected in series with one contact of said other bridge circuit to connect said bridge circuits in series, the remaining contacts constituting the output terminals of said series connected bridge circuits, means responsive to each of a pair of said conditions for moving each of the contacts in one of said bridge circuits, means driven by said motor means for moving one of the contacts in the other of said bridge circuits, manually operable means for moving the other contact in said other bridge circuit, and means connected to said remaining contacts of said bridge circuit and responsive to the potential across said series connected bridge circuits for controlling said motor means.

3. Electrical control apparatus, comprising in combination, a load device to be positioned in accordance with the resultant of a first control effect which varies in accordance with the magnitude and direction of the deviation of a first controlling condition from a predetermined value, and a second control effect which varies in accordance with the magnitude, regardless of direction, of the deviation of a second controlling condition from a predetermined value, motor means for positioning said load device, an electrical network including a source of electrical energy, a first resistance element connected across the terminals of said source in said network, a contact movable along said first resistance element, means responsive to said first controlling condition for moving said contact, a second resistance element having a pair of terminals and a center tap, means connecting both said resistance terminals to one terminal of said source, means connecting said center tap to the other terminal of said source, a second contact movable along said second resistance element, means responsive to said second controlling condition for moving said second contact, and means responsive to the electrical potential between said contacts for controlling said motor means.

4. Electrical apparatus for controlling the elevator surface of an aircraft, comprising in combination, motor means for driving said elevator surface, an electrical network including a source of electrical energy, a first resistance element connected across the termials of said source in said network, a contact movable along said first resistance, means responsive to the deviation of said aircraft from a predetermined flight attitude for moving said contact, a second resistance element having a pair of terminals and a center tap, means connecting both said resistance terminals to one terminal of said source, means connecting said center tap to the other terminal of said source, a second contact movable along said second resistance element, means responsive to the tilting of said aircraft about an axis passing longitudinally therethrough for moving said second contact, and means responsive to the electrical potential between said contacts for controlling said motor means.

5. Electrical apparatus for positioning the rudder of an aircraft, comprising in combination, motor means for driving said rudder, a pair of bridge circuits, each said bridge circuit comprising a source of electrical energy, a pair of resistances connected in parallel across the terminals of said source, and a pair of contacts, one movable along each of said resistances, said pair of contacts constituting the output terminals of said bridge circuit, one contact of one bridge circuit being connected in series with one contact of said other bridge circuit to connect said bridge circuits in series, the remaining contacts constituting the output terminals of said series connected bridges, means responsive to the deviation of said aircraft from a predetermined course for moving one of the contacts in one of said bridge circuits, means responsive to the tilting of said aircraft about an axis passing longitudinally therethrough for moving the other contact in said one bridge circuit, means driven by said motor means for moving one of the contacts in the other of said bridge circuits, manually operable means for moving the other contact in said other bridge circuit, and means connected to said remaining contacts of said bridge circuits and responsive to the potential across said series connected bridge circuits for controlling said motor means.

6. Electrical apparatus for positioning the ailerons of an aircraft, comprising in combination, motor means for driving said ailerons, a pair of bridge circuits, each said bridge circuit comprising a source of electrical energy, a pair of resistances connected in parallel across the terminals of said source, and a pair of contacts, one movable along each of said resistances, said pair of contacts constituting the output terminals of said bridge circuit, one contact of one bridge circuit being connected in series with one contact of said other bridge circuit to connect said bridge circuits in series, the remaining contacts constituting the output terminals of said series connected bridge circuits, means responsive to the deviation of said aircraft from a predetermined course for moving one of the contacts in one of said bridge circuits, means responsive to the tilting of said aircraft about an axis passing longitudinally therethrough for moving the other contact in said one bridge circuit, means driven by said motor means for moving one of the contacts in the other of said bridge circuits, manually operable means for moving the other contact in said other bridge circuit, and means responsive to the potential across said series connected bridge circuits for controlling said motor means.

7. Electrical control apparatus, comprising in combination, a load device to be positioned in accordance with the resultant of a first control effect which varies in accordance with the magnitude and direction of the deviation of a first controlling condition from a predetermined value, and a second control effect which varies in accordance with the magnitude, regardless of direction, of the deviation of a second controlling condition from a predetermined value, motor means for positioning said load device, an electrical network including a source of electrical energy, first variable impedance means connected across the terminals of said source in said network, an output terminal associated with said first variable impedance means, means responsive to said first controlling condition for varying said first impedance means and thereby changing the potential of its associated output terminal, second variable impedance means having a pair of terminals and a center tap, means connecting both said impedance terminals to one terminal of said source, means connecting said center tap to the other terminal of said source, a second output terminal associated with said second impedance means, means responsive to said second controlling condition for varying said second impedance and thereby changing the potential of its associated output terminal, and means responsive to the electrical potential between said output terminals for controlling said motor means.

8. Electrical control apparatus, comprising in combination, a load device to be positioned in accordance with the resultant of a first control effect which varies in accordance with the magnitude and direction of the deviation of a first controlling condition from a predetermined value, and a second control effect which varies in accordance with the magnitude, regardless of direction, of the deviation of a second controlling condition from a predetermined value, motor means for positioning said load device, an electrical network including a source of electrical energy, a first resistance element connected across the terminals of said source in said network, a contact movable along said first resistance element, means responsive to said first controlling condition for moving said contact, a second resistance element having a pair of terminals and a center tap, a pair of fixed impedances, means connecting both said resistance terminals through one of said fixed impedances to one terminal of said source, means connecting said center tap through the other of said fixed impedances to the other terminal of said source, a second contact movable along said second resistance element, means responsive to said second controlling condition for moving said second contact, and means responsive to the electrical potential between said contacts for controlling said motor means.

9. Electrical control apparatus, comprising in combination, a load device to be positioned in accordance with the resultant of a first control effect which varies in accordance with the magnitude and direction of the deviation of a first controlling condition from a predetermined value, and a second control effect which varies in accordance with the magnitude, regardless of direction, of the deviation of a second controlling condition from a predetermined value, motor means for positioning said load device, an electrical network including a source of electrical energy, a first resistance element connected across the terminals of said source in said network, a contact movable along said first resistance element, means responsive to said first controlling condition for moving said contact, a second resistance element having a pair of terminals and a center tap, means connecting both said resistance terminals to one terminal of said source, means connecting said center tap to the other terminal of said source, a second contact movable along said second resistance element, means including a third resistance element connecting said second contact and said center tap, a third contact movable along said third resistance, means responsive to said second controlling condition for moving said second contact, manually operable means for moving said third contact, and means responsive to the electrical potential between said first and third contacts for controlling said motor means.

10. Electrical apparatus for controlling the elevator surface of an aircraft, comprising in combination, motor means for driving said elevator surface, an electrical network including a source of electrical energy, a first resistance element connected across the terminals of said source in said network, a contact movable along said first resistance, means responsive to the deviation of said aircraft from a predetermined flight attitude for moving said contact, a second resistance element having a pair of terminals and a center tap, means connecting both said resistance terminals to one terminal of said source, means connecting said center tap to the other terminal of said source, a second contact movable along said second resistance element, means responsive to the tilting of said aircraft about an axis passing longitudinally therethrough for moving said second contact, means including a third resistance element connecting said second contact and said center tap, a third contact movable along said third resistance, manually operable means for moving said third contact, and means responsive to the electrical potential between said first and third contacts for controlling said motor means.

11. Electrical apparatus for positioning a flight controlling surface on an aircraft, comprising in combination; motor means for driving said surface; a pair of electrical networks; each said network comprising a source of electrical energy; a pair of variable impedances connected to said source of energy, and a pair of output terminals having a voltage thereacross dependent upon the values of said variable impedances, two means each responsive to a different one of a pair of controlling conditions indicative of the need for operation of said surface and each varying one of the impedances in one of said networks, means driven by said motor means for varying one of the impedances in the other of said networks; manually operable means for varying the other impedance in the said other network, one output terminal of each network being connected to an output terminal of another of said networks to connect said networks in series, and means connected to the remaining terminals of said networks and responsive to the potential across said series connected networks for controlling said motor means.

12. Electrical control apparatus, comprising in combination; a load device to be positioned in accordance with the resultant of a plurality of controlling conditions; motor means for driving said load device; a plurality of electrical networks; each said network comprising a source of electrical energy, a pair of variable impedances connected to said source of energy and a pair of output terminals having a voltage thereacross dependent upon the values of said variable impedances, two means each responsive to a different one of a pair of said conditions and each varying one of the impedances in one of said networks, means driven by said motor means for varying one of the impedances in the other of said networks, manually operable means for varying the other impedance in said other network; one output terminal of each network being connected to an output terminal of another network to connect said networks in series, and means connected to the remaining terminals of said networks and responsive to the potential across said series connected networks for controlling said motor means.

13. In flight control apparatus for an aircraft having an airfoil surface for controlling the attitude of the craft about an axis, positioning means for said surface means automatically responsive to attitude changes of the aircraft with respect to two axes for controlling the positioning means, manual means for controlling the positioning means, and means for gradually and selectively increasing the effect of both said attitude changes in said automatically responsive means on said positioning means relative to that of said manual means from a condition in which said automatic means has substantially no control of said airfoil surface whereby the control effect of said automatic means on said positioning means may be selectively varied.

14. In flight control apparatus for an aircraft having an airfoil surface for controlling the bank attitude of the aircraft about an axis, a motor for positioning said airfoil surface, attitude responsive means for controlling said motor, said attitude responsive means comprising two attitude responsive controls one automatically positioned in accordance with the attitude of the craft about its roll axis and the other automatically positioned in accordance with the attitude of the craft about its turn axis, manual control means for also controlling said motor, and means for gradually and selectively increasing the effect of both said attitude responsive controls in controlling said motor without affecting the relative effects on said motor of said attitude responsive controls from a condition in which said automatic means has substantially no control of said motor for positioning said airfoil surface.

15. In flight control apparatus for an aircraft having an airfoil surface for controlling the attitude of the craft, which airfoil surface has a normal position which can be altered, a motor for positioning said airfoil surface, control means of the follow up type for controlling said motor, said control means including a first controller automatically positioned in accordance with the attitude of said aircraft, a second follow up controller positioned by said motor, a third controller for altering the existing normal position of said surface to provide another normal position, and means for varying the extent of movement of said motor and hence said airfoil surface resulting from a predetermined change in the position of said first controller without affecting the position of said airfoil surface when said airfoil surface is in any normal position as determined by the adjustment of the third controller.

16. Electrical control apparatus comprising in combination: a load device to be positioned, motor means for driving said load device, a first electrical network including a source of power and two resistors connected in parallel across said power source, a wiper for one resistor positioned by a first condition responsive means, a wiper for the other resistor positioned by a second condition responsive means, a resistance element having a high impedance in comparison to the network resistors connected across said wipers which constitute the output members of said first network, a wiper for said resistance element, a second network comprising a source of power and an additional resistor connected across said power source, a manually operable wiper for said additional resistor said wiper being one output member of said second network and said second network having a second output member, potential responsive means for controlling said motor means, means connecting one output member of said first network to said potential responsive means, means connecting one output member of said second network to said potential responsive means, and means connecting the other output member of the second network with the high impedance resistance wiper, and means for adjusting the wiper of said high impedance resistance element whereby said potential responsive means may be solely controlled by said manually controlled network or progressively by both networks.

17. Electrical control apparatus comprising in combination: a load device to be positioned; motor means for driving said load device; a first electrical network including a source of power and two variable impedances connected in parallel across said source of power; adjustable means responsive to a first condition connected to one impedance member; a second adjustable means responsive to a second condition connected to said other impedance member; output connections from said network; means including a variable impedance connected across said output connections; a second network including a source of power, a variable impedance connected across said source of power, and having output connections; manual means for varying the impedance in said second network; potential responsive means for controlling said motor means; means connecting an output connection from said first network to said potential responsive means; means connecting an output connection from said second network to said variable impedance connected across said output connections of said first network; means connecting the other output connection from said second network to said potential responsive means; and means for varying the impedance of said impedance connected across said network output connections whereby said potential responsive means may be controlled solely by said second network or gradually controlled by said first network and said second network.

18. Electrical control apparatus comprising in combination: a load device to be positioned for controlling two conditions; motor means for driving said load device; a plurality of sources of voltage each having a pair of output connections across which the voltage may be varied in magnitude and phase; means connecting the output connection of a first source including a variable impedance; means connecting an output connection of a second source to said variable impedance; a potential responsive means for controlling said motor means; means connecting an output connection of the first source to said potential responsive means; means connecting said remaining output connection of the second source to said potential responsive means; means responsive to said two conditions for varying the voltage across the output connections of said first source; means for varying the voltage output of said second source; and means for varying the impedance whereby said potential responsive means may be controlled solely by the voltage of said second source or gradually by said first source and said second source.

19. Apparatus for positioning a flight control surface on an aircraft for controlling a plurality of conditions of said craft comprising in combination: motor means for driving said surface; a first and second source of variable voltage each source having a pair of output terminals; means responsive to a first and a second of said conditions for varying the voltage across the terminals of said first source of voltage; means operated by said motor means and a manually operable means for varying the voltage across the terminals of said second source of voltage; a variable impedance connected across the terminals of said first source of voltage; potential responsive means for controlling said motor means; means connecting a terminal of said first voltage source to said potential responsive means, one terminal of said second source to said variable impedance, and the other terminal of said second voltage source to said potential responsive means; means for varying said impedance whereby control of said potential responsive means and said motor means may be gradually shifted from sole control by said second source of voltage to control by said first and second sources of voltage.

20. The structure of claim 19 with the sources of voltage arranged so that the potential across the terminals of said first and second source of voltage may be varied in magnitude and phase.

21. Apparatus for positioning a flight control surface on an aircraft comprising in combination: motor means for driving said surface; a pair of electrical networks, each said network comprising a source of electrical energy, a pair of variable impedances connected in parallel to said source of energy and a pair of output terminals having a voltage there across dependent upon the values of said variable impedances; two means each responsive to a different one of a pair of controlling conditions indicative of the need of operation of said control surface and each varying one of the impedances in a first of said networks; means driven by said motor means for varying one of the impedances in a second of said networks; manually operable means for varying the other impedance in the said second network; a variable impedance having a high value in comparison with the impedances of said networks and connected across the output terminals of said first network; potential responsive means for controlling said motor means; means connecting one output terminal of said first network to said potential responsive means; means connecting one output terminal of said second network to said impedance connected across the first network outputs; means connecting the other output terminal of said second network to said potential responsive means; means for varying said high impedance whereby said motor means may be controlled solely by said second network or gradually by said first and second networks.

22. Control apparatus for an aircraft having a control surface for controlling the attitude of the craft about an axis comprising: motor means for positioning said control surface; a control means including a condition responsive means responsive to two conditions indicative of the need for operating said control surface for controlling said motor means; manual means for controlling said motor means; and means included in said control means for gradually and selectively increasing the effect of said condition responsive means on said control means to alter its effect on said motor means relative to that of said manual means from a condition in which said condition responsive means has substantially no control of said motor means to that in which said motor means is controlled by said condition responsive means and said manual means.

23. In flight control apparatus for an aircraft having a control surface for controlling the position of the aircraft about an axis: motor means for positioning said control surface; potential responsive means for controlling said motor means; control means for controlling said potential responsive means, said control means including a first and second network, said first network having a source of voltage, a variable resistor connected across said voltage source, and two output members, and said second network having a source of voltage, two variable resistors connected in parallel across said voltage source, means for varying the voltage across said last two resistors, and two output members; means responsive to a change in position of said aircraft about an axis for adjusting said first network resistor, manual means for adjusting one resistor in said second network, and means driven by said motor means for adjusting the other resistor in said second network, means connecting one first network output to said potential responsive means; means connecting one second network output to the other first network output; and means connecting the other second network output to said potential responsive means whereby the normal position of said control surface may be selectively varied by operation of the manual means and the extent of movement of the control surface in response to a given output of the first network may be varied by operation of the voltage varying means without changing the normal rudder position.

24. In an automatic control device for a craft, the combination with a position-maintaining means for detecting movement of said craft about a control axis thereof, and a control surface for controlling the attitude of said craft about said control axis, of a control system between said position-maintaining means and said control surface for moving the latter in response to movements of said position-maintaining means relative to said craft such that said craft is normally maintained in a predetermined position relative to said axis, trim control means included in said control system for shifting the position of said control surface relative to the position of said control member, means included in said control system for changing the control sensitivity of said system, and compensating means for the trim control operated by said sensitivity control whereby a change in the position of said craft about said axis which would otherwise be caused by such change in sensitivity is nullified.

25. In an automatic control device for a craft, the combination with a position-maintaining means for detecting movement of said craft about a control axis thereof and a rudder for controlling the attitude of said craft about said control axis, of a control system between said position-maintaining means and said rudder for normally maintaining a predetermined flight attitude of said craft, a course setter included in said control system for selectively changing the relative positions of said position-maintaining means and said rudder, means included in said control system for changing the control sensitivity of said system for adjusting the control system for different craft speeds, altitudes, etc., and means operated by such sensitivity control for modifying the influence of the course setter such that changes in the control sensitivity of the system have a minimized effect on the attitude of said craft.

26. Electric control apparatus comprising in combination; a reversible motor for positioning a load device in accordance with the value of a condition, a main control voltage producing device, a control point adjusting voltage producing device, a follow up voltage producing device, each of said devices having an adjusting element and producing a voltage output whose magnitude is dependent upon the position of said adjusting element, circuit means connecting said voltage outputs in series to provide a resultant voltage the magnitude and direction of which is dependent upon the magnitudes and directions of the various voltage outputs of said devices, motor controlling means responsive to said resultant voltage for controlling said motor to cause it to operate in a direction dependent upon the direction of said resultant voltage, means responsive to said condition for positioning the adjusting elements of said main control device, means positioned by said motor for operating the adjusting element of said follow up device so that the load device is automatically moved to a position corresponding to the value of said condition, manual means for positioning the adjusting element of said control point adjusting device to manually vary the position in which said load device is automatically maintained by said condition responsive means, impedance means, and means including said impedance means for applying the output voltages of said control point adjusting and follow-up devices to said motor controlling means independently of said main control device so that said motor may be manually controlled under the control of said control point adjusting and said follow-up devices.

27. A complex electrical network comprising in combination; first and second bridge circuits, said bridge circuits each having two output terminals, a potentiometer having a variable tap, means connecting said potentiometer across the output terminals of the first of said bridge circuits, means connecting the tap of said potentiometer to one of the output terminals of the second of said bridge circuits, and network output terminals comprising one output terminal of the first of said bridge circuits and the output terminal of the second of said bridge circuits opposite that connected to the tap of said potentiometer, said output terminals having a voltage thereon which is equal to the output voltage of said second bridge circuit when the tap of said potentiometer is in one position and the sum of the output voltages of said first and second bridge circuits when the tap of said potentiometer is in a second position.

28. A bridge circuit having a pair of output leads and input leads for connection across a source of power, the circuit including: a pair of voltage sources, one comprising a first potentiometer whose resistor is connected across said input leads and whose wiper is connected to one of said output leads; the second comprising a second potentiometer whose resistor is connected in parallel with said resistor of said first potentiometer; and a third potentiometer, one end of whose resistor is connected to the wiper of said second potentiometer and the other end thereof is connected to a null point of said second voltage source and whose wiper is connected to the other of said output leads, whereby movement of said wiper of said third potentiometer toward said null point will increase the amount of movement of the wiper of said second potentiometer necessary to balance a given signal introduced by said first potentiometer.

29. In a condition control system, having a condition changing device, a condition responsive means for detecting changes in said condition; a control system between said condition responsive means and said condition changing device for moving the latter in response to operation of said condition responsive means from a control point such that said condition is normally maintained at a desired magnitude; trim control means included in said control system for shifting the position of said condition changing device relative to the control point of the condition responsive means; means included in said control system for changing the control sensitivity of said system; and compensating means for the trim control operated by said sensitivity control whereby a change in the condition which would otherwise be caused by said change in sensitivity is nullified.

30. In an automatic control device for a craft, the combination with a position-maintaining means for detecting movement of said craft about a control axis thereof, and attitude control means for controlling the attitude of said craft about said control axis, of a balanceable control system connected between said position maintaining means and said attitude control means for moving the latter in response to movements of said position-maintaining means relative to said craft such that said craft is normally maintained in a predetermined position relative to said axis, trim control means included in said balanceable control system for shifting the position of said attitude control means relative to the position of said position-maintaining means, means included in said control system for changing the control sensitivity of said system, and compensating means for the trim control operated by said sensitivity control whereby a change in the position of said craft about said axis which would otherwise be caused by such change in sensitivity is nullified.

31. In automatic control apparatus for a craft, the combination with a condition responsive means operable from a normal position for detecting departure of said craft from a predetermined condition, and condition changing means positionable for controlling the condition of said craft, of a balanceable control system connected between said condition responsive means and said condition changing means for moving the latter in response to change in said condition such that said craft is normally maintained in a predetermined condition, trim control means included in said control system for shifting the position of said condition changing means relative to the normal position of said responsive means, means included in said control system for changing the control sensitivity of said system, and compensating means for the trim control responsive to said sensitivity control whereby a change in the position of said craft about said axis which would otherwise be caused by such change in sensitivity is nullified.

32. In an automatic condition control apparatus, the combination with a condition responsive means for detecting changes of said condition, and a condition changing means, of a control system connected between said condition responsive means and said condition changing means for adjusting the latter in response to changes of said condition such that said condition is normally maintained at a predetermined magnitude, trim control means included in said control system for adjusting said condition changing means relative to the null position of said responsive means, sensitivity control means included in said control means for changing the relative adjustment of the changing means for a change in said condition and thus alter the control sensitivity of said system, and compensating means for the trim control and controlled by said sensitivity control whereby a change in the condition which would otherwise be caused by such change in sensitivity is nullified.

References Cited in the file of this patent

UNITED STATES PATENTS

| | | |
|---|---|---|
| 1,324,134 | Sherry | Dec. 9, 1919 |
| 1,586,233 | Anshutz Kaempfe | May 25, 1926 |
| 1,706,968 | Schleicher et al. | Mar. 26, 1929 |
| 1,826,013 | Meredith | Oct. 6, 1931 |
| 1,896,805 | Sperry et al. | Feb. 7, 1933 |
| 2,137,974 | Fischel | Nov. 22, 1938 |

(Other references on following page)

UNITED STATES PATENTS

| | | |
|---|---|---|
| 2,154,375 | Chambers | Apr. 11, 1939 |
| 2,154,523 | Midyette | Apr. 18, 1939 |
| 2,232,077 | Rosecky | Feb. 18, 1941 |
| 2,257,471 | McGrath | Sept. 30, 1941 |
| 2,270,875 | Hanson et al. | Jan. 27, 1942 |
| 2,336,492 | MacKay | Dec. 14, 1943 |
| 2,356,597 | Kronenberger | Aug. 22, 1944 |
| 2,394,384 | Horstmann | Feb. 5, 1946 |
| 2,452,311 | Markusen | Oct. 26, 1948 |

FOREIGN PATENTS

| | | |
|---|---|---|
| 449,886 | Germany | Sept. 28, 1927 |
| 473,335 | Germany | Mar. 15, 1929 |
| 504,591 | Germany | Aug. 6, 1930 |